Patented Oct. 5, 1954

2,691,038

UNITED STATES PATENT OFFICE 2,691,038

POLYMERS OF TETRAHYDROFURAN

Vaughn A. Engelhardt, Claymont, Del., assignor to E. I. du Pont de Nemours and Company, Wilmington, Del., a corporation of Delaware No Drawing. Application April 9, 1953,
Serial No. 347,853

10 Claims. (Cl. 260—484)

This invention relates to the preparation of polymers from tetrahydrofuran, a readily available compound, which is a saturated cyclic compound containing carbon, hydrogen, and one oxygen ether linkage. Such compounds have generally been considered to be inert. However, in the presence of ionic catalysts, particularly combinations of a halogenated alkyl ether with antimony pentachloride, the ring is broken at one of the ether carbon-oxygen and linear polyethers formed as shown in French Patent 898,269. The products obtained have a plurality of recurring polytetramethyleneoxy units with the end groups dependent upon the catalyst system employed. In general, the terminal groups have consisted of chlorine or hydroxyl or derivatives of the hydroxyl. None of the systems hitherto described have permitted the production of polymers having terminal carboxylic acid groups, or their corresponding alkyl esters.

This invention has as an object the provision of a new process for preparing polymers from tetrahydrofuran. A further object is the provision of a new class of polymers. Another object is the provision of a new class of polytetramethyleneoxide polymers with novel characteristics. Other objects will appear hereinafter.

These objects are accomplished by the present invention wherein tetrahydrofuran is treated, under anhydrous conditions, with boron trifluoride and an organic non-ionic diazo compound containing up to seven carbons and having both valences of the diazo, —$N_2$— group attached to the same aliphatic carbon.

The following examples in which parts are by weight are illustrative of the invention.

EXAMPLE I

Boron trifluoride tetrahydrofuran complex (0.9 part) was added dropwise with stirring to ethyl diazoacetate (22 parts) in tetrahydrofuran (196 parts) keeping the temperature at 30–40° C. by occasional cooling in ice. After the exothermic reaction had subsided, the solution was stirred overnight at room temperature. Unreacted tetrahydrofuran was removed by distillation under reduced pressure (54°/35 mm.). The residual viscous oil was dissolved in ether, washed with aqueous 5% sodium bicarbonate and water and dried over magnesium sulfate. After distillation of ether, the residue was heated at 110° C./0.7 mm., leaving 122 parts of viscous polymeric oil which solidified to a colorless greasy solid.

*Analysis*

Calculated for
$C_2H_5OOC—CH_2[O(CH_2)_4]_{19}CHF—COOC_2H_5$:
C, 64.5; H, 10.6; F, 1.2; Mol. Wt., 1562; Sap. Equiv., 781

Found:
C, 65.0; H, 10.8; F, 1.2; N, 0; Mol. Wt., 1490; Sap. Equiv., 780; g. $H_2$/g., 0.

The infrared spectrum showed a band for hydroxyl but no bands for unsaturation. The greasy solid was saponified to the sodium salt by boiling with 1 N sodium hydroxide solution. From this solution the acid was obtained by acidification with hydrochloric acid.

EXAMPLE II

Ethyl diazoacetate (0.57 part) was added with stirring to a solution of boron trifluoride (.7 part) in tetrahydrofuran (36 parts) keeping the temperature at 30–40° C. by occasional cooling. After the exothermic reaction had subsided, the solution was stirred overnight at room temperature. The product was worked up as described in Example I to give 26 parts of colorless waxy solid polymer, M. P. 41–43° C.

*Analysis*

Calculated for $C_2H_5O_2C—CH_2[O(CH_2)_4]_{36}OH$:
C, 65.8; H, 11.0; Mol. Wt., 2700

Found:
C, 64.8; H, 10.8; Mol. Wt., 2660

EXAMPLE III

A solution of boron trifluoride etherate (1.1 parts) in ethyl diazoacetate (2.7 parts) was prepared at 0° C. This solution was added portionwise with stirring to tetrahydrofuran (27 parts) over a period of two hours. After standing overnight at room temperature, the product was worked up as described in Example I to give 18.1 parts of yellow polymeric oil.

*Analysis*

Calculated for $C_2H_5O_2C—CH_2[O(CH_2)_4]_{20}OH$:
C, 65.3; H, 10.9; Mol. Wt., 1546; Sap. Equiv., 1546

Found:
C, 64.0; H, 11.0; Mol. Wt., 1580; Sap. Equiv., 1140

EXAMPLE IV

Boron trifluoride tetrahydrofuran complex (1 part) was added dropwise intermittently with stirring to a solution of diazomethane (1.46 parts) in tetrahydrofuran (75 parts) at —50° C. so that a steady evolution of nitrogen was maintained. An hour and a half after the addition, the solution was allowed to warm to room temperature. Unreacted tetrahydrofuran was removed under reduced pressure, leaving a thick viscous oil (25 parts) which was dissolved in either and washed with aqueous 5% sodium bicarbonate and then with aqueous 10% sodium chloride. After drying over magnesium sulfate, the ether was distilled and the residue was heated at 100° C./0.8 mm. to give 18 parts of waxy solid, M. P. 44° C.

*Analysis*

Calculated for $CH_3[O(CH_2)_4]_{46}CH_2OH$:
C, 66.4; H, 11.2; Mol. Wt., 3363
Found:
C, 65.7; H, 11.0; Mol. Wt., 3340

The infrared spectrum showed no terminal unsaturation, no carbonyl but hydroxyl was found.

EXAMPLE V

A solution of diazomethane (0.1 part) in tetrahydrofuran (5 parts) was added dropwise with stirring over a period of ten minutes to boron trifluoride tetrahydrofuran complex (.35 part) in tetrahydrofuran (36 parts) at −50° C. After an hour and fifteen minutes the solution was allowed to warm to room temperature. The product was worked up as in Example I to give six parts of colorless waxy solid, M. P. 40–43° C.

*Analysis*

Calculated for $CH_3[O(CH_2)_4]_{65}OH$:
C, 66.4; H, 11.2; Mol. Wt., 4719
Found:
C, 65.8; H, 11.0; Mol. Wt., 4700

When the general process of the above Examples was repeated except that either the diazo compound or boron trifluoride was omitted, no polymeric product was obtained.

In the process of this invention, tetrahydrofuran,

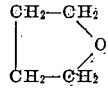

is polymerized under anhydrous conditions by a diazo compound and boron trifluoride to a repeating chain of tetramethyleneoxy,

units. The termini completing the chain are dependent upon the specific diazo compound employed and the mode of addition. Thus the products of Example I, consist primarily of dibasic acid esters when the boron trifluoride/tetrahydrofuran complex was added to ethyl diazoacetate in tetrahydrofuran. When the mode of addition was reversed, the primary product was the hydroxy acid.

Boron trifluoride can be employed as the compound itself or as ether complexes. The ethers of the boron trifluoride ether complexes which can be employed are the saturated hydrocarbyl ethers, preferably of up to ten carbons, containing oxygen only as ether oxygen; e. g., dimethyl and diamyl ether. Such complexes are preferred since they are liquid under the reaction conditions and more convenient to employ than gaseous boron trifluoride. The amount of boron trifluoride can vary within wide limits. In general, amounts of from about 0.1 to 5 parts of boron trifluoride per 100 parts of tetrahydrofuran are employed. Amounts in excess of this are usually uneconomical and give low molecular weight polymer, whereas small amounts of less than 0.1% can be employed but generally increase the time required for polymerization.

The diazo compound employed has the general formula $RCHN_2$. These diazo compounds are non-ionic and have the two nitrogen atoms attached to one aliphatic carbon. They include diazomethane, diazoethane, methyl ester of diazoacetic acid, ethyl ester of diazoacetic acid, n-butyl ester of diazoacetic acid, phenyldiazomethane, diazoacetone, and 2-methoxydiazomethane, diazoacetonitrile, 2,2,2-trifluorodiazoethane and diazoacetophenone. The preferred diazo compounds are those of the formula $RCHN_2$, wherein R is H, $CH_3$, $COOC_2H_5$, $C_6H_5$, $-C=OCH_3$, $CH_3OCH_2-$, $-CN$, $CF_3$, and $C_6H_5CO-$. They thus include hydrogen and monovalent organic radicals of up to seven carbons, particularly those containing only carbon, hydrogen, up to two oxygens, including carbonyl and methoxy, nitrogen as in cyano groups and halogen groups.

Particularly preferred in view of the dibasic acids obtained are the alkyl alpha-diazoalkanoates wherein the alkyl is of one to two carbons and the alkanoate is of an acid of two to four carbons, e. g., an acetate, propionate, or butyrate.

The amount of diazo compound employed must be sufficient to provide terminal groups on the tetrahydrofuran polymer. Amounts of from 0.2 to 50 and preferably 1 to 20 parts of diazo compound per hundred parts of tetrahydrofuran are generally employed.

The polymerization is carried out under anhydrous conditions. The temperature of the reaction can vary within wide limits, e. g., from −60 to 60° C. Generally the temperature selected is such that pressure reaction vessels are not required, and the diazo compound does not undergo excessive thermal decomposition. The temperature is generally below 40° C. The time required for the reaction is not critical and may vary quite widely. Times are generally of the order of one hour to 24 hours. Exact times and temperatures depend upon the specific diazo compound employed.

The tetrahydrofuran is employed in excess since it is cheap and readily available. Thus, the use of added solvents is unnecessary and purification is thereby simplified.

The polymeric products of this invention are readily isolated by removal of the unreacted boron trifluoride, diazo compound and tetrahydrofuran, generally through washing and distillation.

The polymer thus obtained ranges from a viscous oil to a solid and has a molecular weight of the order of 500 to 5000. The products obtained have terminal functional groups that are dependent upon the specific diazo compound employed and on the order of addition of diazo compound and boron trifluoride. With a diazo ester such as ethyl diazoacetate, the polymer obtained has terminal ester groups. The average number of ester end groups per polymer chain is two when boron trifluoride is added to tetrahydrofuran containing the diazo ester. When the diazo ester is added to tetrahydrofuran containing boron trifluoride, the polymer obtained contains an average of one ester group per molecule. This illustrates that at least one of the terminal portions of the tetrahydrofuran polymer are derived from the diazo compound through the removal of nitrogen. Other functional groups are likewise obtained by the use of suitable diazo compounds.

Particularly preferred polymers obtained by the process of this invention are those having the formula $$H(CH_2)_nOOCCH_2[O(CH_2)_4]_xCHRCOO(CH_2)_nH$$

wherein R is hydroxyl or fluorine and $n$ is a cardinal number of 0 to 2 and $x$ is an integer of from 10 to 50, preferably 15 to 30.

The products of this invention are useful as lubricants and plasticizers for high molecular weight polymers. The acids and esters, upon saponification, give soaps that are useful in detergent applications. They are useful as polyfunctional polymer intermediates.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A polymer having a chain of recurring tetramethyleneoxy, $-OCH_2CH_2CH_2CH_2-$ units and a molecular weight of 500 to 5000, said polymer having two terminal units, one a $$-CH_2CO_2C_2H_5$$

unit and the other a $CHFCO_2C_2H_5$ unit.

2. A polymer of the formula $$H(CH_2)_nOOCCH_2[O(CH_2)_4]_xCHRCOO(CH_2)_nH$$

wherein R is selected from the class consisting of hydroxyl and fluorine, $x$ is an integer from 10 to 50, and $n$ is a cardinal number not greater than 2.

3. A polymer of the formula $$H(CH_2)_nOOCCH_2[O(CH_2)_4]_xCHFCOO(CH_2)_nH$$

wherein $x$ is an integer from 10 to 50, and $n$ is a cardinal number not greater than 2.

4. Process for the preparation of polymers which comprises bringing tetrahydrofuran in contact with boron trifluoride and ethyl diazoacetate.

5. Process for the preparation of polymers which comprises bringing tetrahydrofuran in contact with boron trifluoride and an alkyl diazoacetate of no more than six carbons.

6. Process for the preparation of polymers which comprises bringing tetrahydrofuran in contact with boron trifluoride and an alkyl diazoacetate wherein the alkyl group is of no more than two carbons.

7. Process for the preparation of polymers which comprises bringing tetrahydrofuran in contact with boron trifluoride and an alkyl alpha-diazoalkanoate.

8. Process for the preparation of polymers which comprises bringing tetrahydrofuran in contact with boron trifluoride and a non-ionic diazo compound of up to seven carbons having the diazo, $N_2$, group attached by both of its valences to a single aliphatic carbon, said diazo compound being selected from the class consisting of diazohydrocarbons of up to seven carbons and alkyl alpha-diazoalkanoates wherein the alkyl is of one to two carbons and the alkanoic acid is of two to four carbons.

9. A polymer of the formula $$H(CH_2)_nOOCCH_2[O(CH_2)_4]_xCHRCOO(CH_2)_nH$$

wherein R is selected from the class consisting of hydroxyl and fluorine, $x$ is an integer from 15 to 30, and $n$ is a cardinal number not greater than 2.

10. A polymer of the formula $$H(CH_2)_nOOCCH_2[O(CH_2)_4]_xCHFCOO(CH_2)_nH$$

wherein $x$ is an integer from 15 to 30, and $n$ is a cardinal number not greater than 2.

FOREIGN PATENTS

| Number | Country | Date |
|---|---|---|
| 898,269 | France | July 3, 1944 |

OTHER REFERENCES

Resins Rubber Plastics, Second Series, pages 1063–1064, Code 00:100; Interscience Publishers Inc., N. Y. (1948).